(12) United States Patent (10) Patent No.: US 8,480,377 B2
Ciocanel et al. (45) Date of Patent: Jul. 9, 2013

(54) INTEGRATED ELECTRO-MAGNETOHYDRODYNAMIC MICROPUMPS AND METHODS FOR PUMPING FLUIDS

(75) Inventors: Constantin Ciocanel, Flagstaff, AZ (US); Nazmul Islam, Flagstaff, AZ (US)

(73) Assignee: Arizona Board of Regents, acting for and on behalf of Northern Arizona University, Flagstaff, AZ (US)

( * ) Notice: Subject to any disclaimer, the term of this patent is extended or adjusted under 35 U.S.C. 154(b) by 351 days.

(21) Appl. No.: 12/854,395

(22) Filed: Aug. 11, 2010

(65) Prior Publication Data

US 2011/0037325 A1 Feb. 17, 2011

Related U.S. Application Data

(60) Provisional application No. 61/233,033, filed on Aug. 11, 2009.

(51) Int. Cl.
*H02K 44/00* (2006.01)
(52) U.S. Cl.
USPC ............. 417/50; 204/450; 204/600; 204/660
(58) Field of Classification Search
USPC ............. 417/48, 50; 204/600, 601, 450, 451, 204/664, 660; 422/505
See application file for complete search history.

(56) References Cited

U.S. PATENT DOCUMENTS

| | | | | |
|---|---|---|---|---|
| 3,198,119 A * | 8/1965 | Mead | | 417/50 |
| 3,257,949 A * | 6/1966 | Mead | | 417/50 |
| 6,537,437 B1 * | 3/2003 | Galambos et al. | | 204/600 |
| 7,016,560 B2 * | 3/2006 | Ticknor et al. | | 385/16 |
| 8,348,626 B2 * | 1/2013 | Roy | | 417/48 |
| 2007/0274840 A1 * | 11/2007 | Ehben et al. | | 417/50 |
| 2008/0314749 A1 * | 12/2008 | Johnson et al. | | 204/450 |
| 2011/0020141 A1 * | 1/2011 | Van Zon et al. | | 417/50 |

* cited by examiner

*Primary Examiner* — Devon Kramer
*Assistant Examiner* — Nathan Zollinger
(74) *Attorney, Agent, or Firm* — Fennemore Craig, P.C.

(57) ABSTRACT

An integrated electro-magnetohydrodynamic pump may include a flow channel adapted to contain a fluid to be pumped and a plurality of electrodes positioned adjacent the flow channel. A voltage controller operatively associated with the plurality of electrodes applies a voltage potential on the plurality of electrodes. A plurality of magnets are also positioned adjacent the flow channel. A voltage controller operatively associated with the plurality of magnets changes magnetic fields produced by the plurality of magnets with respect to the flow channel. The voltage controller and the magnet controller are operable to pump fluid contained in the flow channel by an electro-osmotic flow process and by a magnetohydrodynamic flow process.

28 Claims, 9 Drawing Sheets

INTEGRATED ELECTRO-MAGNETOHYDRODYNAMIC MICROPUMPS AND METHODS FOR PUMPING FLUIDS

CROSS-REFERENCE TO RELATED APPLICATION

This application claims the benefit of co-pending U.S. Provisional Application No. 61/233,033, filed Aug. 11, 2009 which is hereby incorporated by reference for all that it discloses.

TECHNICAL FIELD

The present invention relates to pumping systems in general and more specifically to micropumps having enhanced performance and efficiency.

BACKGROUND

Miniaturized pumps for pumping small volumes of fluids are known in the art and are used to pump a wide range of fluids in any of a wide range of micro-fluidic applications, ranging from portable fuel cells, to drug delivery systems, to microelectronic cooling systems just to name a few. Micropumping systems are a relatively new development, and systems are still being sought that offer improved performance, better control, and efficiency over existing designs.

SUMMARY OF THE INVENTION

An integrated electro-magnetohydrodynamic pump according to one embodiment of the invention may include a flow channel adapted to contain a fluid to be pumped and a plurality of electrodes positioned adjacent the flow channel. Voltage control means operatively associated with the plurality of electrodes applies a voltage potential on the plurality of electrodes. A plurality of magnets are also positioned adjacent the flow channel. Magnet control means operatively associated with the plurality of magnets changes magnetic fields produced by the plurality of magnets with respect to the flow channel. The voltage control means and the magnet control means are operable to pump fluid contained in the flow channel by an electro-osmotic flow process and by a magnetohydrodynamic flow process.

Another embodiment of an integrated electro-magnetohydrodynamic pump may have a flow channel adapted to contain a fluid to be pumped. A plurality of electrodes and a plurality of electromagnets are positioned adjacent the flow channel. A voltage control system operatively associated with the electrodes applies a voltage potential on said plurality of electrodes, whereas a current control system operatively associated with the electromagnets applies an electric current to the electromagnets. The voltage and current control systems are operable to pump fluid contained in the flow channel by a combination of electro-osmotic and magnetohydrodynamic flow.

Also disclosed is a method for pumping a fluid that involves the steps of: Filling a flow channel with the fluid to be pumped; creating an electric field within at least a portion of the flow channel to pump the fluid by an electro-osmotic flow process; and creating a magnetic field within at least a portion of the flow channel to pump the fluid by a magnetohydrodynamic flow process, so that the fluid is moved within the flow channel by a combination of the electro-osmotic and magnetohydrodynamic flow processes.

Yet another embodiment of an electro-magnetohydrodynamic pump according to the present invention may include flow channel means for containing a fluid to be pumped. Electro-osmotic pumping means operatively associated with the flow channel means pumps the fluid by an electro-osmotic flow process. Magnetohydrodynamic pumping means operatively associated with the flow channel means pumps the fluid by a magnetohydrodynamic flow process. Control system means operatively associated with said electro-osmotic pumping means and said magnetohydrodynamic pumping means selectively operates the electro-osmotic pumping means alone, the magnetohydrodynamic pumping means alone, and the electro-osmotic pumping means together with the magnetohydrodynamic pumping means, to pump the fluid contained in the flow channel means solely by the electro-osmotic flow process, solely by the magnetohydrodynamic flow process, and by a combination of the electro-osmotic and magnetohydrodynamic flow processes.

BRIEF DESCRIPTION OF THE DRAWINGS

Illustrative and presently preferred embodiment of the invention are shown in the accompanying drawings in which:

FIGS. 6(a-j) are enlarged cross-sectional views in elevation of a fabrication sequence of the pump section illustrated in FIG. 2;

FIGS. 7(a-f) are schematic representations of a pumping sequence of the integrated pump embodiment illustrated in FIG. 2;

DETAILED DESCRIPTION OF THE PREFERRED EMBODIMENTS

Figure 1:
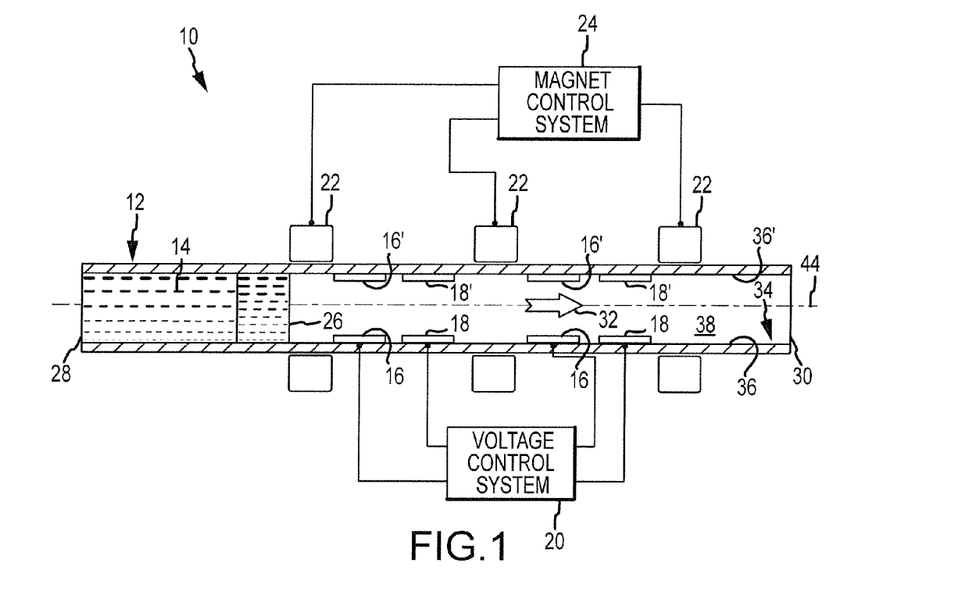
FIG. 1 is a schematic representation of one embodiment of an integrated electro-magnetohydrodynamic pump according to one embodiment of the present invention.

One embodiment of an integrated electro-magnetohydrodynamic pump 10 according to the present invention is illustrated schematically in FIG. 1 and may comprise a flow channel 12 that is configured or adapted to contain a fluid 14 to be pumped. Pump 10 may also comprise a plurality of electrodes 16, 18 that are positioned adjacent flow channel 12. A voltage control system 20 operatively connected to the various electrodes 16 and 18 applies a voltage potential to the electrodes 16 and 18 in a manner that will be described in further detail herein. Pump 10 also may be provided with a plurality of magnets 22 that are also positioned adjacent the flow channel 12. In one embodiment, magnets 22 comprise electromagnets, although other types of magnets may be used. A magnet control system 24 operatively associated with each of the magnets 22 causes the magnetic fields (not shown) produced by the magnets 22 to change with respect to flow channel 12 in a manner that will also be described in further detail herein. For example, in an embodiment wherein the magnets 22 comprise electromagnets, magnet control system 24 changes the magnetic fields by selectively energizing and de-energizing the magnets 22.

Pump 10 may be used to pump the fluid 14 by two different types of processes that may be used separately or in combination to achieve various objects and advantages of the invention. The first process is an electro-osmotic flow process by which the fluid 14 is pumped or moved in response to electric potentials placed on the various electrodes 16 and 18. The second process is a magnetohydrodynamic flow process by which the fluid 14 is pumped or moved in response to the magnetic fields produced by the magnets 22. As will be described in much greater detail herein, the magnetohydrodynamic flow process may be enhanced by providing within flow channel 12 a magnetic fluid "slug" 26.

Pump 10 may be operated as follows to move or pump fluid 14 from an inlet 28 of flow channel 12 to an outlet 30 of flow channel 12, i.e., generally in the direction indicated by arrow 32. In one embodiment, the flow of fluid 14 may be started by operating the magnet control system 14 to initiate the magnetohydrodynamic flow process. In this process, the magnet control system 24 energizes the magnet 22 that is immediately "downstream" (i.e., with reference to the desired flow direction 32) from the fluid slug 26. In the embodiment illustrated in FIG. 1, the left-most magnet 22 (i.e., immediately to the right of magnetic fluid slug 26), is the first "downstream" magnet 22 that is energized. The magnetic field (not shown) produced by the energized, downstream magnet 22 draws the magnetic fluid slug 26 to the right, i.e., in the flow direction 32. Once the magnetic fluid slug 26 reaches magnet 22, magnet 22 is de-energized. The magnet control system 24 then energizes the next downstream magnet 22 (e.g., the middle magnet 22 in FIG. 1), which draws the magnetic fluid slug 26 further downstream (i.e., in the flow direction 32) toward the now-energized magnet 22.

This movement of the fluid slug 26 in the flow direction 32 may be sustained by the sequential activation and de-activation of the various magnets 22 in the manner just described. The motion of the magnetic fluid slug 26 creates a pressure difference in the flow channel 12 that draws additional fluid 14 through inlet 28. In addition, fluid (not illustrated in FIG. 1) that is downstream from (i.e., ahead of) the fluid slug 26 is pushed along by the moving fluid slug 26, toward the outlet 30 of flow channel 12.

Pump 10 may also be operated to pump or move the fluid 14 by the electro-osmotic flow process in which the fluid 14 is pumped or moved in response to electric potentials placed on the various electrodes 16 and 18. Briefly, in the electro-osmotic flow process, the voltage control system 20 provides an alternating voltage potential (often with a DC bias or offset) to the various electrodes 16, 18. In such an embodiment, the electro-osmotic flow process may also be referred to herein as an "AC electro-osmotic" flow process, because it involves the application of an AC voltage to the various electrodes 16, 18 in the electrode array. The voltage potential between the various electrodes 16, 18 induces an electro-osmotic flow condition at the surface/boundary 34 of flow channel 12. The electro-osmotic flow process creates a "slip" condition at the surface/boundary 34 of flow channel 12 that substantially reduces the frictional flow losses that would otherwise occur (i.e., in the absence of the slip condition). Accordingly, simultaneous use of both the magnetohydrodynamic and electro-osmotic flow processes substantially reduces the power required to move or pump the fluid 14 through the flow channel 12. In the particular embodiment just described, only the fluid 14 located upstream of the fluid slug 26 is subjected to the electro-osmotic flow process. Alternatively, however, other arrangements are possible, as will be described in further detail herein.

Figure 2:
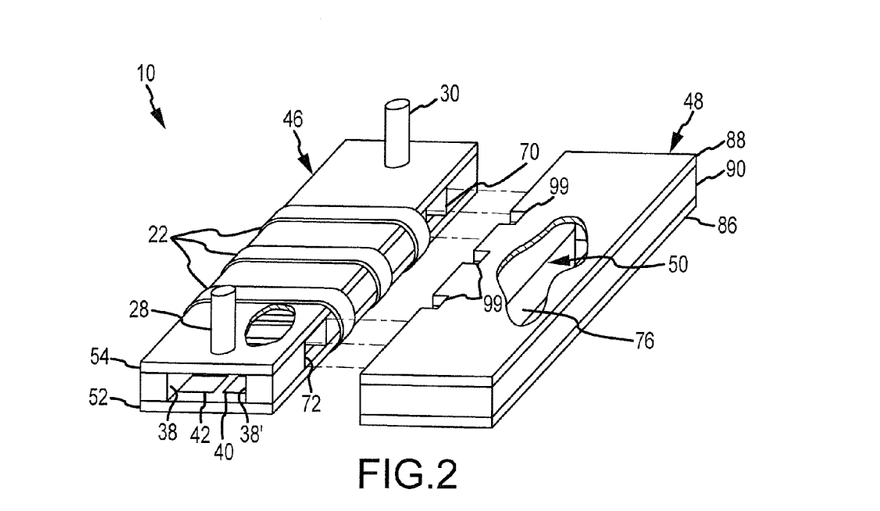
FIG. 2 is a perspective view of integrated electro-magnetohydrodynamic pump as it may be implemented in a micro-electro-mechanical system architecture and divided into a pump section and a reservoir section.

The various embodiments of the integrated electro-magnetohydrodynamic pump 10 according to the present invention may be implemented as a micro-electro-mechanical system (MEMS), as best seen in FIG. 2. In such a MEMS-type of configuration, the pump 10 may be used to transport or pump small amounts of fluid in any of a wide range of micro-fluidic applications. Exemplary micro-fluidic applications include proton exchange membrane fuel cell water management, drug delivery systems, bio-fluid analysis, and micro-electronics cooling, just to name a few.

A significant advantage of the present invention is that it may be operated to pump fluid by a combination magnetohydrodynamic and electro-osmotic fluid flow processes. The fluid "slip" condition created at the boundary or surface 34 of flow channel 12 by the electro-osmotic flow process significantly reduces surface tension and shear (i.e., viscous) stresses at the boundary 34. These reduced surface tension and shear stresses substantially reduce frictional losses. Such a reduction of frictional losses is particularly significant in micropump type applications involving small flow channels with large surface area-to-volume ratios. The pump also has no moving parts, is self-priming, and is capable of bi-directional (i.e., reversible) fluid flow. The bi-directional capabilities of the pump would allow it to be readily used in a variety of biomedical applications, for example, in blood glucose meters, wherein the pump may draw in a blood sample for analysis and then pump or dispense an appropriate quantity of insulin.

Still yet other advantages of the integrated pump are that it is highly-controllable and can be used to pump fluids over a wide range of flow rates. For example, comparatively high flow rates can be achieved by operating the pump 10 simultaneously in both the magnetohydrodynamic and electro-osmotic flow modes. The pumping rate in this "dual pumping" mode of operation can be varied by varying the voltages and currents provided to the electrodes 16, 18 and magnets 22, in the manner described herein. Lower fluid pumping rates can be achieved by operating the pump 10 in the magnetohydrodynamic flow mode only, i.e., by de-activating the electro-osmotic pumping mode. Significantly, even still lower flow rates can be achieved by operating the pump 10 in the electro-osmotic flow mode only, i.e., by de-activating the magnetohydrodynamic flow mode.

Yet another advantage of the integrated pump is that it can be used to pump liquids alone, gases alone, or combinations of liquids and gases (i.e., liquids and gases simultaneously). Liquids that can be pumped by the integrated pump of the present invention include, but are not limited to, aqueous liquids (neutral, acidic, and basic), non-aqueous liquids, polar and non-polar liquids, as well as gels and creams, provided that their viscosities are sufficient low to allow the liquid to be pumped through the various flow channels involved. Non-magnetic and magnetic liquids, including ferrofluids and magnetorheological fluids, may also be used with the present invention. Moreover, the liquids need not comprise pure or single-phase liquids, but may also include slurries (i.e., particle suspensions), colloidal solutions, and emulsions containing multiple phases. Gases that may be utilized with the present invention include oxygen, carbon dioxide, nitrogen, and various gas mixtures, including air.

When implemented as a "micropump," e.g., as a MEMS device or a so-called "lab-on-a-chip" device, the various control circuits, e.g., the voltage control system 20 and magnet control system 24, may be readily incorporated or provided in the same package. In such a configuration, the operating voltages are quite low (typically involving bias voltages of about 500 millivolts (mV) or so). Moreover, electrolysis and various undesired secondary effects (e.g., bubble generation) can be avoided or minimized by operating the pump 10 at high frequencies.

Having briefly described one embodiment of the integrated electro-magnetohydrodynamic pump 10 according to the present invention, as well as some of its more significant features and advantages, various exemplary embodiments of the present invention will now be described in detail. However, before proceeding with the description, it should be noted that while the various embodiments of the invention are shown and described herein as they could be implemented in a MEMS-type configuration, i.e., as a "micropump" for pumping small quantities of fluids at relatively low flow rates and pressures, the present invention could be implemented in other configurations as well, as would become apparent to persons having ordinary skill in the art after having become familiar with the teachings provided herein. Consequently, the present invention should not be regarded as limited to the particular device implementations, fluids, and applications shown and described herein.

Referring back now to FIGS. 1 and 2 simultaneously, one embodiment 10 of an integrated electro-magnetohydrodynamic pump according to the present invention is shown and described herein as it may be implemented or configured as a micro-electro-mechanical system (MEMS). In such an implementation, the pump 10 is quite small, typically involving a flow channel 12 having at least one dimension (i.e., depth or width) that is less than about 1 mm. Indeed, in many implementations, the flow channel 12 may have cross-sectional dimensions (i.e., depths and widths) that range from about 0.1 micron (μm) to 500 μm. In such an implementation, the integrated pump of the invention may be referred to herein in the alternative as a "micropump." Fluid flow rates and pressures in such micropump implementations may be in a range of about 40-60 microliters per minute (μl/min) and about 2 kilo-Pascals (kPA), although these values are exemplary only. Of course, pumps having other sizes and implementations may be capable of operations at different flow rates and pressures. Consequently, the present invention should not be regarded as limited to flow channels having any particular dimensions or as limited to any particular flow rates or pressures.

Pump 10 may also comprise a plurality of electrodes 16, that are provided adjacent flow channel 12. The various electrodes 16, 18 together comprise an array of electrodes and should be provided adjacent those regions of the flow channel 12 wherein it will be desired to pump the fluid 14 by the electro-osmotic flow process. In the particular embodiment shown in FIG. 1, the array of electrodes, i.e., comprising the various electrodes 16 and 18, is provided along areas or regions of the flow channel 12 that are substantially co-extensive with the areas or regions of the flow channel 12 that also include the magnets 22. Alternatively, other arrangements are possible (e.g., wherein the array of electrodes is provided along other sections of the flow channel), as would become apparent to persons having ordinary skill in the art after having become familiar with the teachings provided herein. Consequently, the present invention should not be regarded as limited to any particular electrode configuration.

In one embodiment, the various electrodes 16 and 18 (i.e., comprising the array of electrodes) are provided on a single side (e.g., the bottom portion or surface 36) of flow channel 12. However, in certain applications or configurations it may be desirable to provide a second set of electrodes 16', 18' on an opposing side or surface of the flow channel. For example, in another embodiment, a second set of electrodes 16', 18' may be provided on a top portion or surface 36' of flow channel 18, as best seen in FIG. 1. In still another embodiment, the various electrodes 16, 18, and optionally, a second set of electrodes 16', 18', may be provided on the side walls or portions 38, 38' of flow channel 12 (sidewalls 38 and 38' are illustrated in FIG. 2).

Regardless of where the various electrodes 16, 18, are positioned with respect to flow channel 12, and regardless of whether a second set of electrodes (e.g., 16', 18') are provided in opposed relation, the various electrodes 16, 18 comprising the array are configured so that they are arranged in an alternating or interleaved configuration, with individual ones of electrodes 16 separated by an electrode 18 and vice-versa. See FIGS. 1 and 3. Depending on the particular embodiment and application, the various electrodes 16 and 18 comprising the electrode array may be configured so that they are substantially the same size (i.e., so that the various electrodes 16 and 18 have surface areas that are substantially identical to one another), as best seen in FIG. 1. Alternatively, in another embodiment, the various electrodes 16, 18 comprising the electrode array may be configured so that they have different surface areas. For example, and with reference now to FIG. 3, the electrode array may be configured so that the various electrodes 16 have surface areas that are greater than the surface areas of the electrodes 18.

The various electrodes 16 and 18 may be independently connected to voltage control system 20, as best seen in FIG. 1. Alternatively, the various electrodes 16 may be connected to one another to form the interleaved configuration illustrated in FIG. 3. That is, the various electrodes 16 comprising the electrode array may be connected together so that all the electrodes 16 may be conveniently connected to voltage control system 20 via a single node or pad 40. Similarly, the various electrodes 18 comprising the array may be connected together so that they may be connected to voltage control system 20 via a single node or pad 42.

Regardless of the particular configuration and arrangement of the various electrodes 16, 18 (and regardless of whether an opposing set of electrodes 16', 18', is provided), the various electrodes 16, 18 are connected to voltage control system 20. As briefly mentioned above, voltage control system 20 provides a means for applying a voltage potential on the various electrodes 16 and 18. Together, the combination of the electrodes 16, 18 and voltage control system 20 comprise electro-osmotic pumping means for pumping the fluid 14 in flow channel by the electro-osmotic flow process. In the particular embodiments shown and described herein, the voltage control system 20 provides the same potential to all the electrodes 16 and to all the electrodes 18. That is, the voltage potential between any two electrodes 16 and 18 will be substantially identical. Alternatively, in another embodiment, the configuration may be such that the voltage control system 20 provides different voltage potentials to the various ones of electrodes 16 and 18 comprising the electrode array. The ability to provide different voltage potentials to the various electrode pairs 16 and 18 may be advantageous in certain applications.

Consequently, the present invention should not be regarded as limited to any particular configuration in this regard.

The voltage potential provided on electrodes 16, 18 by voltage control system 20 may comprise either an alternating current (AC) voltage or an alternating current (AC) voltage in combination with a direct current (DC) bias or DC offset voltage, depending on the particular configuration of the electrodes 16, 18 and whether it is desirable to operate the pump 10 in a bi-directional (i.e., reversible) manner. If the electrodes 16, 18 are symmetrical (e.g, having the same surface areas as illustrated in FIG. 1), then the voltage control system 20 will be configured to provide an AC voltage or signal with a DC bias or offset in order to cause the fluid 14 to flow in the desired direction. The flow direction of pump 10 may be reversed by changing or reversing the polarity of the DC bias.

Figure 3:
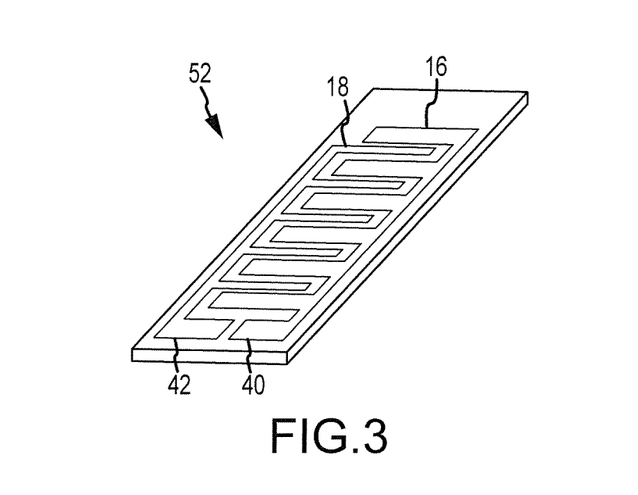
FIG. 3 is an enlarged perspective view of a portion of an electrode plate of the pump section illustrated in FIG. 2.

However, in an embodiment wherein the electrodes 16, 18 are asymmetrical (e.g., wherein the electrodes 16 and 18 have different surface areas, as illustrated in FIG. 3), pump 10 may be operated in the electro-osmotic mode even without a DC offset. That is, pumping may be achieved by applying to the (asymmetrical) electrodes 16, 18, an AC voltage with no DC offset. However, it should be noted that the flow of a pump with asymmetrical electrodes could still be reversed by applying a DC offset, although usually of greater magnitude than if the electrodes are symmetrical.

Stated somewhat differently, the electro-osmotic pumping process refers to the bulk fluid motion induced by the application of an electric field to the flow channel. The electro-osmotic pumping process of the present invention is based on a biased AC electro-osmosis technique for a symmetrical electrode array. When a biased AC voltage or signal (i.e., an AC voltage or signal with a DC offset) is applied to the electrodes 16, 18, the resulting flow is uni-directional (e.g., in the flow direction indicated by arrow 32 in FIG. 1). If the polarity of the DC bias or offset is reversed, the flow will reverse direction (e.g., the fluid 14 will flow in the direction opposite arrow 32 in FIG. 1). The +DC and −DC signals are responsible for producing the bi-directional fluid flow.

With electrodes positively biased, the two charging mechanisms produce ions of opposite signs in an electrical field, which in turn results in electro-osmotic flows in opposite directions. However, capacitive charging cannot produce a polarization exceeding the equilibrium charge density on the electrode side, while Faradaic charging can produce charge densities orders of magnitude beyond equilibrium values. Biased AC electro-osmotic flow capitalizes on the alternating dominance of capacitive and Faradaic charging to break electrode polarization symmetry and consequently realize directed flow motion. Thus, the biased AC electro-osmotic micropump can operate in both directions. The symmetry is broken by applying an asymmetric voltage on the symmetric electrode pattern, which eventually breaks the symmetry of the complete system.

The AC signal may comprise any of a wide range of voltages and frequencies depending on the particular configuration and flow rate, with higher frequencies resulting in generally higher flow rates. Consequently, the present invention should not be regarded as limited to AC signals having any particular voltage or frequency. However, by way of example, in one embodiment, AC signal may have an RMS voltage in a range of about 3 volts to about 4 volts, and a frequency in a range of about 500 Hz to about 1500 Hz. The DC offset voltage may be in a range of about 500 mV to about 700 mV.

The voltage control system 20 may comprise any of a wide range of circuits and systems suitable for providing to the electrodes 16, 18 the desired voltage potentials (e.g., AC alone or AC with a DC offset) and at the desired frequencies. However, because suitable voltage control systems are well known in the art and could be readily provided by persons having ordinary skill in the art after having become familiar with the teachings provided herein, the particular voltage control system 20 that may be used in one embodiment of the present invention will not be described in further detail herein.

Pump 10 may also be provided with a plurality of magnets 22. The magnets 22 may be positioned adjacent flow channel 12 so that the magnetic fields (not shown) produced thereby are generally oriented along a flow axis 44. Magnets 22 may comprise any of a wide range of magnet types suitable for providing a magnetic field that is controllable to cause the fluid 14 and/or magnetic fluid slug 26 to move along the flow axis 44 to establish and/or maintain a flow of fluid 14 within flow channel 12 in the manner described herein. By way of example, in one embodiment, each magnet 22 comprises an electromagnet having one or more wire coils surrounding the flow channel 12 so that the wire coils are substantially perpendicular to the flow axis 44 of the flow channel 12, as best seen in FIG. 2. Alternatively, permanent magnets could also be used.

Each of the magnets 22 is operatively connected to a magnet control system 24. As briefly mentioned above, magnet control system 24 provides a means for changing the magnetic fields produced by the various magnets 22 with respect to the flow channel 12. The combination of the magnets 22 and magnet control system 24 comprise a magnetohydrodynamic pumping means for pumping the fluid 14 in flow channel 12 by the magnetohydrodynamic flow process. In the particular embodiments shown and described herein, e.g., wherein the various magnets 22 comprise electromagnets, the magnet control system 24 is used to provide an electric current to various selected ones of the electromagnets 22. Alternatively, if one or more of the magnets 22 comprise permanent magnets, then magnet control system 24 may be configured to physically move (e.g., by translation along the flow axis 44) the permanent magnet(s) to achieve the desired magnetohydrodynamic flow.

Magnet control system 24 may comprise any of a wide range of circuits and systems suitable for providing to the various electromagnets 22 the desired electric currents at the appropriate times. However, because suitable magnet control systems are well known in the art and could be readily provided by persons having ordinary skill in the art after having become familiar with the teachings provided herein, the particular magnet control system 24 that may be used in one embodiment of the present invention will not be described in further detail herein.

Depending on the particular embodiment and the requirements of the particular application, it may be desirable to provide the pump 10 with an adaptive control system (not shown) that is operatively associated with (e.g., switched between) the voltage control system 20 and/or the magnet control system 24. The adaptive control system may be used to sense the voltages applied to the various electrodes 16, 18, as well as the currents provided to the electromagnets 22, and vary them as necessary so that the pump 10 operates in accordance with the desired performance criteria. The particular adaptive control system that may be utilized with the present invention may comprise any of a wide range of adaptive control systems that are now known in the art or that may be developed in the future that would be suitable for controlling the voltage control system 20 and magnet control system 24 as required for the particular application. However, because such adaptive control systems could be readily provided by persons having ordinary skill in the art after having become familiar with the teachings provided herein, an because a detailed description of the adaptive control system is not required to understand or practice the present invention, the particular adaptive control system that may be utilized in one embodiment of the invention will not be described in further detail herein.

Depending on the nature of the fluid 14 to be pumped, it may be necessary or desirable to provide a magnetic fluid slug 26 in flow channel 12 to assist the magnetohydrodynamic flow process. By way of example, the magnetic fluid slug 26 may comprise a ferrofluid, a magnetorheological fluid, or a magnetic polymer.

A magnetic slug 26 comprising a ferrofluid or a magnetorheological fluid will involve a suspension of magnetic particles in a liquid or semisolid "carrier" whose movement within the flow channel 12 can be controlled by the application of a magnetic field (e.g., generated by magnets 22). For a ferrofluid, Brownian motion will usually be sufficient to keep the particles from settling under gravity. In addition, a surfactant may be placed around each particle, in either the ferrofluid or magnetorheological fluid, to prevent particle agglomeration in the presence of magnetic fields. A magnetic fluid slug 26 comprising a ferrofluid or magnetorheological fluid also should be formulated so that is immiscible with the fluid to be pumped. It is also generally preferred, but not required, that the "carrier" fluid be selected or formulated so that it wets the flow channel 12 with equal or greater wettability than the fluid 14 being pumped. The viscosity of the carrier fluid should be sufficiently low so that the resistance to flow of the magnetic fluid in the channel can be overcome by the applied magnetic fields. Finally, the carrier properties should be maintained under the temperature, pressure, and pH conditions expected for the particular application.

The quantity of ferrofluid or magnetorheological fluid in the slug 26 will depend on a variety of factors, including, without limitation, the particular application, the size of the flow channel 12, the path that it must traverse in the flow channel 12 (e.g., around corners, etc.), the type of fluid 14 to be pumped, and the desired pressure and flow rate of fluid 14. In addition, the response of the magnetic fluid slug 26 within the flow channel 12 will also depend upon the strengths of the magnetic fields produced by the various magnets 22, the distances between the magnets 22 and the slug 26, and the viscosities of the carrier and type of fluid(s) to be moved through the pump.

A magnetic fluid slug 26 comprising a magnetic polymer may comprise one or more polymers (e.g., elastomers) embedded with magnetizable particles. The magnetic polymers can be used as "pistons" and do not pose immiscibility problems with the pumped fluid 14.

As briefly mentioned earlier, pump 10 may be used to pump the fluid 14 by two different types of processes that may be used separately or in combination. The first process is an electro-osmotic flow process (in one embodiment, an AC electro-osmotic flow process) in which the fluid 14 is pumped or moved in response to electric potentials placed on the various electrodes 16 and 18 by the voltage control system 20. The second process is a magnetohydrodynamic flow process in which the fluid 14 is pumped or moved in response to the magnetic fields produced by the magnets 22. Because the electro-osmotic flow process substantially reduces the surface tension and shear stresses at the wall 34 of flow channel 12, it will be generally preferred, but not required, to operate pump 10 in both modes simultaneously. However, as also described herein, there may be situations wherein it is desirable to operate the pump 10 in either the electro-osmotic mode or the magnetohydrodynamic modes separately.

With reference now primarily to FIG. 1, pump 10 may be operated as follows to move or pump fluid 14 from an inlet 28 of flow channel 12 to an outlet 30 of flow channel 12, i.e., generally in the direction indicated by arrow 32. The flow of fluid 14 may be started by operating the pump 10 in the magnetohydrodynamic flow mode, although the flow could be initiated by operating the pump 10 in the electro-osmotic mode. In the magnetohydrodynamic flow mode, the magnet control system 24 may initiate the flow by energizing or applying an electric current to the magnet 22 that is immediately downstream from the magnetic fluid slug 26. In the particular embodiment illustrated in FIG. 1, the left-most magnet 22 (i.e., to the right of magnetic fluid slug 26), is the first downstream magnet 22. The magnetic field produced by the energized downstream magnet 22 draws the magnetic fluid slug 26 toward magnet 22, i.e., in the flow direction 32. Once the magnetic fluid slug 26 reaches magnet 22, magnet control system 24 will de-energize that magnet and energize the next downstream magnet 22 (e.g., the middle magnet 22 in FIG. 1). The activation of the next downstream magnet 22 will draw the magnetic fluid slug 26 further downstream (i.e., in the flow direction 32). This process of successively energizing and de-energizing adjacent magnets 22 can be used to sustain the movement of the fluid slug 26 in the flow direction 32. The movement of the magnetic fluid slug 26 in the flow direction 32 creates a pressure difference in the flow channel 12 that draws additional fluid 14 through inlet 28. Of course, any fluid 14 (not shown in FIG. 1) downstream from the fluid slug 26 will be pushed along by the moving fluid slug 26, ultimately through outlet 30 of flow channel 12.

Pump 10 may also be operated in the electro-osmotic mode to pump or move the fluid 14 by the electro-osmotic flow process. Pump 10 may be operated in the electro-osmotic mode by operating the voltage control system 20 to provide a voltage potential (e.g., an AC voltage potential with or without a DC offset) to the various electrodes 16, 18 in the manner already described. The voltage potential between the various electrodes 16, 18 induces an electro-osmotic flow condition at the surface/boundary 34 of flow channel 12 that creates a slip condition at the surface/boundary 34 of flow channel 12. Stated another way, the surface tension and shear stresses at the wall 34 of flow channel 12 are substantially reduced by the electro-osmotic pumping process, thereby substantially reducing the frictional flow losses that would otherwise occur. Accordingly, simultaneous use of both the magnetohydrodynamic flow process and the electro-osmotic flow process will substantially reduce the power required to move the fluid 14 through the flow channel 12.

The flow rate of pump 10 may be controlled by varying the frequency and magnitude of the AC and DC bias voltage applied to the various electrodes 16, 18, by the magnitude of the current applied to the various magnets 22 and by the changing speed or rate at which the current is applied to the various magnets 22. Generally speaking, maximum flow rates will be achieved by operating the pump 10 in both modes (i.e., the magnetohydrodynamic and electro-osmotic flow modes) simultaneously. The flow rate can be reduced via the appropriate operation of the voltage and magnet control systems 20 and 24 in the manner already described. In addition, a lower flow rate can be achieved by operating the pump 10 in the magnetohydrodynamic mode only (i.e., by disabling the electro-osmotic flow mode). The lower flow rate may be further controlled or modulated via appropriate control of the magnet control system 24. Still lower flow rates can be achieved by operating the pump 10 in the electro-osmotic mode only (i.e., by disabling the magnetohydrodynamic flow mode). These still lower flow rates may be further controlled or modulated as desired via appropriate control of the voltage control system 20.

The flow directions in any of these operational modes (or combination of modes) may be reversed by reversing the sequential activation of the various magnets (i.e., to cause the magnetic fluid slug 26 to change direction within flow channel 12), and/or by reversing the DC offset applied to the various electrodes 16, 18, depending on the particular operational mode of pump 10.

As briefly mentioned above, the various embodiments of the integrated electro-magnetohydrodynamic pump 10 may be implemented as micro-electro-mechanical system (MEMS), as best seen in FIG. 2. In the particular MEMS implementation illustrated in FIG. 2, the pump 10 may comprise a pump portion 46 and a reservoir portion 48. The pump portion 46 may comprise a configuration that is substantially identical to that schematically illustrated in FIG. 1. The reservoir portion 48 comprises a fluid reservoir 50 that provides for the convenient recirculation of the magnetic fluid slug 26 during operation. The operation of a pump section 46 when combined with the reservoir section 48 will be described in greater detail below with reference to FIGS. 7a-f.

Considering now primarily the pump portion 46 illustrated in FIG. 2, the pump portion 46 may comprise a bottom plate 52 and a top plate 54 that are held in spaced-apart relation by sidewalls 38, 38'. Together, these elements define the flow channel 12. In the particular embodiment illustrated in FIG. 2, the electrodes 16, 18 are provided on the bottom plate 52, whereas the flow channel inlet 28 and outlet 30 comprise tubes that are substantially aligned with corresponding apertures 56, 58 provided or formed in top plate 54. See also FIG. 4. The various magnets 22 may comprise wire coils that surround the pump portion 46 in the manner best seen in FIG. 2.

Figure 6A:
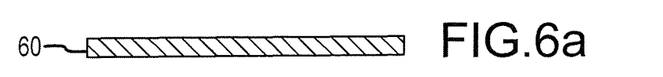
Figure 6B:
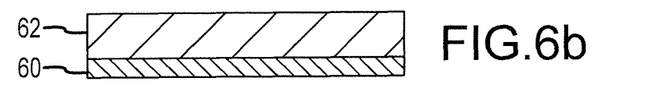
Figure 6C:
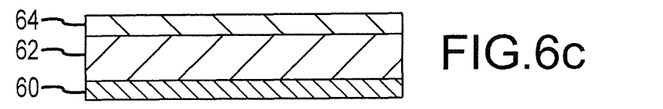
Figure 6D:
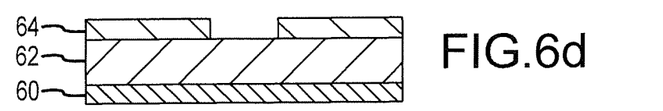
Figure 6E:
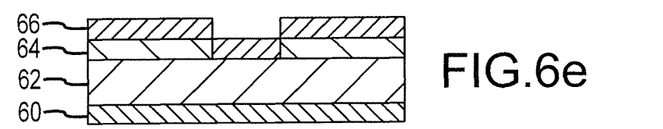
Figure 6F:
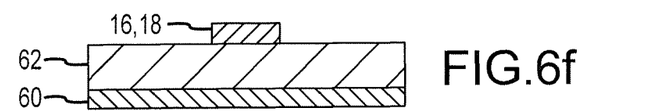

Referring now to FIGS. 3 and 6a-f simultaneously, the pump portion 46 may be fabricated as follows. A first series of steps involves the fabrication of the bottom plate 52 having a plurality of interleaved electrodes 16, 18 provided thereon to form the electrode array. Bottom plate 52 may comprise a silicon wafer which may form a substrate 60 (FIG. 6a). A suitable insulating layer 62, such as silicon nitride ($Si_3N_4$) may be deposited thereon (FIG. 6b) at any suitable thickness. By way of example, in one embodiment, the insulating layer 62 is deposited at a thickness of about 1000 Angstroms. A photoresist layer 64 is then deposited on the insulating layer (FIG. 6c) and patterned to form the desired electrode configuration (FIG. 6d). A metal layer 66 is then deposited on the photoresist layer 64 (FIG. 6e). Metal layer 66 will ultimately form the various electrodes 16, 18. Metal layer 66 may comprise any of a wide range of metals and metal alloys that would be suitable for the particular application. By way of example, in one embodiment, the metal layer 66 is formed by depositing chromium on the photoresist layer 44 to a thickness of about 10 nanometers (nm), followed by a layer of gold, deposited to a thickness of about 90 nm. The extra metal and photoresist are then removed, leaving the formed electrodes 16, 18 (FIGS. 3 and 6f).

Referring now primarily to FIG. 3, the particular electrode configuration utilized in this example MEMS embodiment comprises an interleaved structure or configuration wherein the surface areas of the electrodes 16 is greater than the surface areas of electrodes 18. Stated another way, the electrode configuration is asymmetrical. Alternatively, of course, a symmetrical electrode configuration could also be used.

Figure 4:
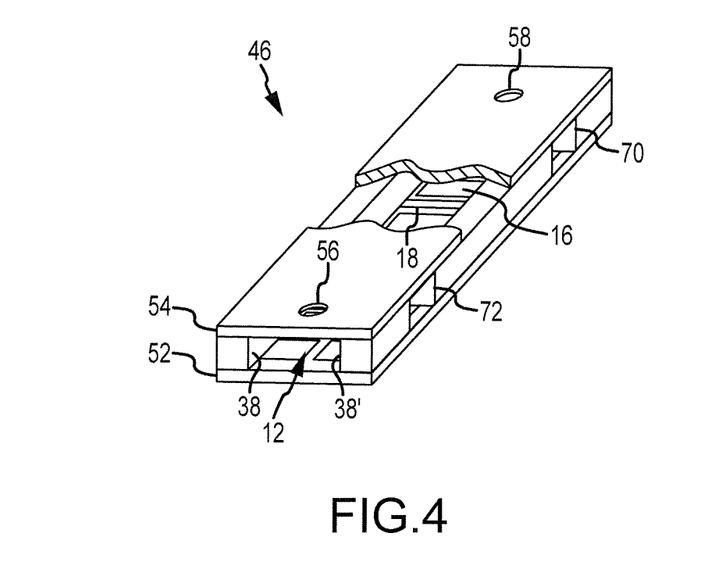
FIG. 4 is an enlarged perspective view of the electrode plate of FIG. 3 having flow channel walls and top plate formed thereon.
Figure 5:
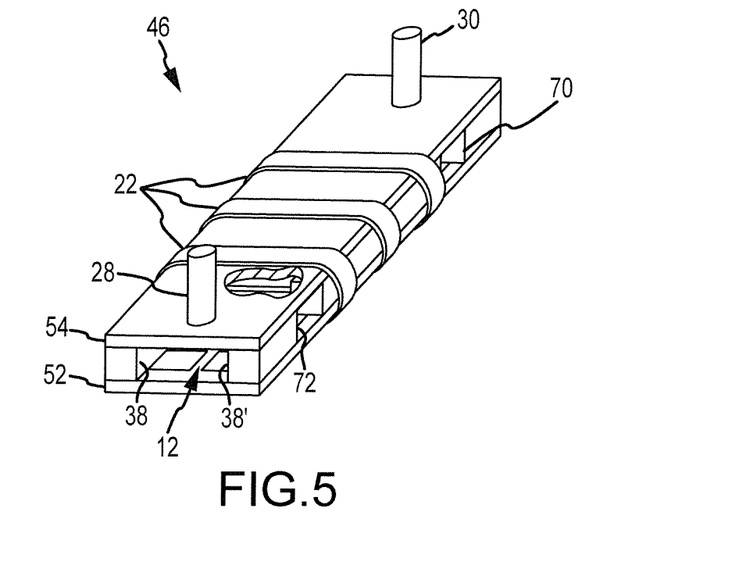
FIG. 5 is an enlarged perspective view of the electrode plate of FIG. 4 showing the inlet and outlet conduits and electromagnet coils provided thereon.
Figure 6G:
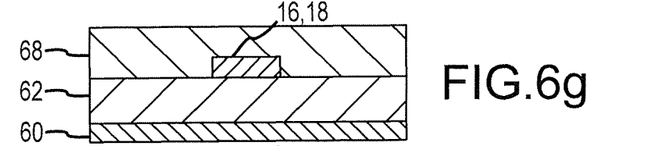
Figure 6H:
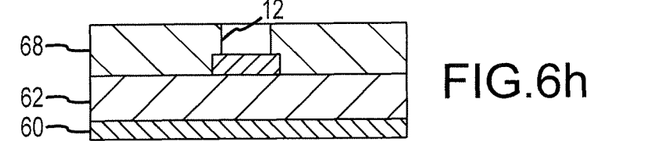
Figure 6I:
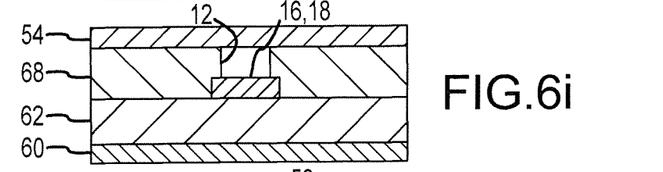
Figure 6J:
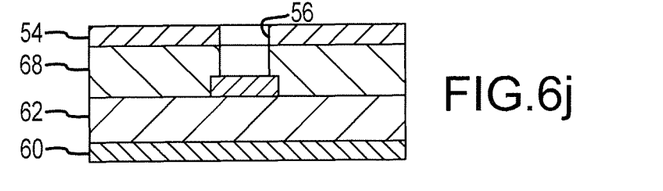

After the bottom plate 52 has been formed with the desired electrode structure, the flow channel 14 may then be deposited or "built" thereon. With reference now to FIGS. 4 and 6g-j, a first step in the process may involve the deposition of a "spin-on-glass" (SOG) layer 68 (FIG. 6g). A flow channel 12 may then be formed in SOG layer 68 by suitable process, such as, for example, by reactive ion etching (RIE). See FIG. 6h. If the pump portion 46 is to be used with the reservoir portion 48 (FIG. 2), then suitable openings 70, 72 may be formed in the sidewall 38' defined by SOG layer 68. An RIE process may be used to form openings 70 and 72. The top plate 54 may then be bonded or adhered to layer 68. By way of example, in one embodiment, top plate 54 may comprise borosilicate glass, although other materials could be used. Finally, the various apertures (e.g., 56, 58, FIG. 4) may be formed in top plate 54. See FIG. 6j. A reactive ion etching process may be used to form the apertures 56, 58. The fabrication of the pump portion 46 may be completed by providing a plurality of wire coils 74 around the pump portion so that they substantially encircle or surround the flow channel 12 defined therein, as best seen in FIG. 5. The wire coils 74 form the magnets 22. Suitable inlet and outlet tubes 28 and 30 may then be affixed to the top plate 54 so that they are substantially aligned with the respective apertures 56 and (FIG. 4).

In many embodiments, pump 10 may be provided with a fluid reservoir 50 that allows for the convenient recirculation of the magnetic fluid slug 26. For example, in the particular MEMS implementation illustrated in FIG. 2, the fluid reservoir 50 may be provided by means of a reservoir portion 48 that may be mounted to the pump portion 46 of the MEMS device. The reservoir portion 48 may be fabricated separately from the pump portion 46, as illustrated in FIG. 2. However, it should be noted that other configurations and fabrication sequences are possible.

Referring now to FIGS. 7a-f, the pump portion 46 of a pump 10 having a fluid reservoir 50 may be substantially identical to the pump 10 illustrated schematically in FIG. 1. That is, pump portion 46 may comprise a flow channel 12 that is configured or adopted to contain a fluid 14 to be pumped. Pump portion 46 may also comprise a plurality of electrodes 16, 18 positioned adjacent the flow channel 12. The electrodes may be provided along a single wall or portion (e.g., bottom portion 36) of flow channel 12, as illustrated in FIGS. 7a-f. Alternatively, an opposed set of electrodes (not shown in FIGS. 7a-f) may also be provided, e.g., on the top portion 36' (FIG. 1), as already described. In addition, the electrodes 16, 18 could comprise symmetrical electrodes, in which the surface areas of the two electrodes 16 and 18 would be substantially identical. Alternatively, the electrodes 16, 18, could comprise asymmetrical electrodes e.g., wherein the surface areas of electrodes 16 is greater than the surface areas of electrodes 18, as illustrated in FIGS. 7a-f.

Regardless of the particular configuration of the electrodes 16, 18, the various electrodes may be operatively connected to a voltage control system 20 (not shown in FIGS. 7a-f, but shown in FIG. 1) suitable for providing the desired voltage potentials on the various electrodes 16, 18.

Pump portion 46 may also be provided with a plurality of magnets 22 arranged around the flow channel 12, in the manner illustrated in FIGS. 7a-f. Magnets 22 may comprise electromagnets, although other types of magnets may also be used. The various magnets 22 may be operatively connected to a magnet control system 24 (FIG. 1) suitable for controlling the various magnets 22 in the manner already described.

The fluid reservoir 50 is defined by a reservoir channel 76 that extends between first and second openings 70 and 72 provided in flow channel 12. See also FIGS. 2, 4, and 5. Fluid reservoir 50 is configured or adopted to contain a quantity of magnetic fluid 78, a portion of which may be used to form magnetic fluid slug 26 (see also FIG. 1). Reservoir portion 48 may also be provided with a pair of "gate" magnets 80, 82 adjacent openings 70, 72. Gate magnets 80 and 82 may be operatively connected to magnet control system 24 (not shown in FIG. 7a, but shown in FIG. 1). As will be described in greater detail below, magnet control system 24 may operate gate magnets 80 and 82 to allow the magnetic fluid 78 to be drawn into and released from the fluid reservoir 50. In one embodiment, gate magnets 80 and 82 comprise electromagnets, although other kinds of magnets could also be used.

Reservoir section 48 may also be provided with a plurality of optional "flow assist" magnets 84 positioned so that they surround the reservoir channel 76 in the manner best seen in FIGS. 7a-f. Optional flow assist magnets 84 may be used to assist in the movement or flow of the magnetic fluid 78 in reservoir channel 76. If optional flow assist magnets 84 are used, they may be connected to magnet control system 24 (FIG. 1) and operated as required to assist in the flow of the magnetic fluid 78 in reservoir channel 76. Optional flow assist magnets 84 may also comprise electromagnets, although other types of magnets could also be used.

Pump section 46 may be operated in conjunction with reservoir section 48 to pump fluid 14 in flow channel 12. In such an embodiment, the reservoir 50 facilitates the recirculation of the magnetic fluid slug 26 (which comprises a portion of the magnetic fluid 78) between successive pump cycles.

Figure 7A:
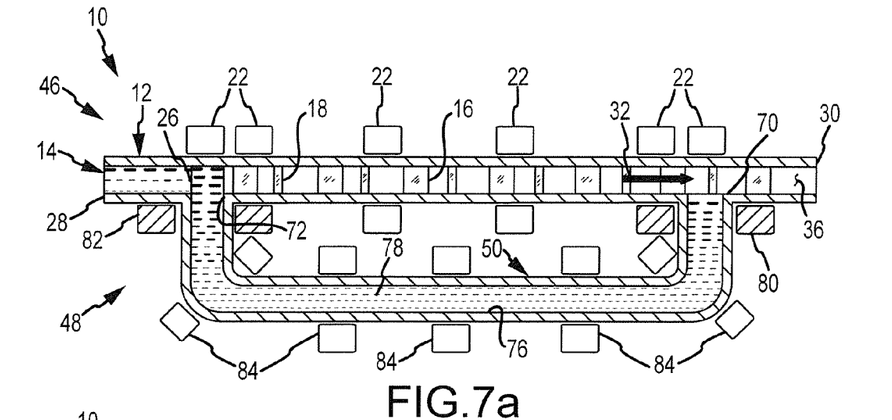
Figure 7B:
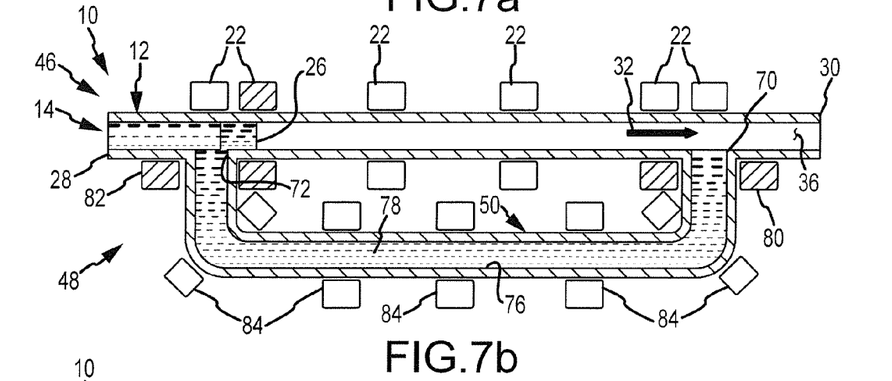

At the start of the pump cycle, depicted in FIG. 7a, the gate magnets 80 and 82 are activated to prevent additional magnetic fluid 78 from reservoir 50 from entering flow channel 12 once the flow begins. In FIGS. 7a-f, energized or activated magnets are cross-hatched for easy identification. That is, the magnetic fluid slug 26 is effectively separated from the magnetic fluid 78 contained in reservoir 50. Then, as depicted in FIG. 7b, the magnet 22 immediately downstream of magnetic fluid slug 26 is activated (i.e., by magnet control system 24, FIG. 1), as shown by the cross-hatching in FIG. 7b. The resulting magnetic field (not shown) draws the fluid slug 26 toward downstream magnet 22 which initiates the flow of fluid 14 in flow channel 12. At this time, the voltage control system 20 (FIG. 1) may activate the appropriate electrodes 16, 18 to initiate the electro-osmotic flow process in the manner described above.

Figure 7C:
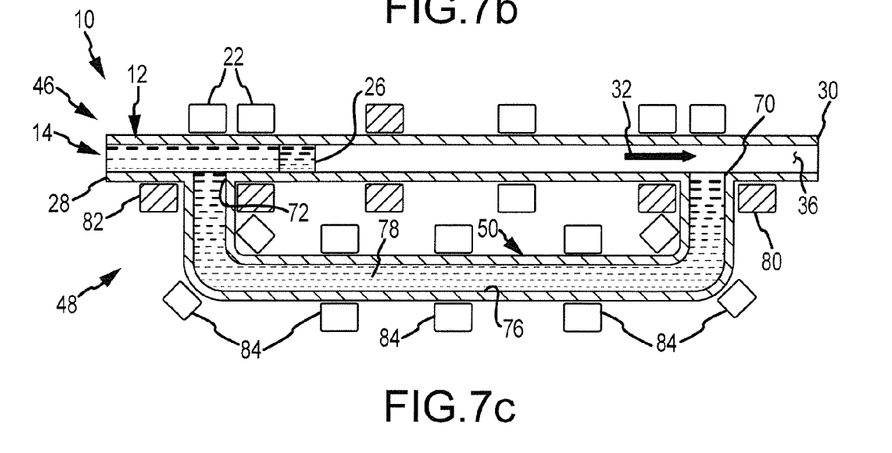
Figure 7D:
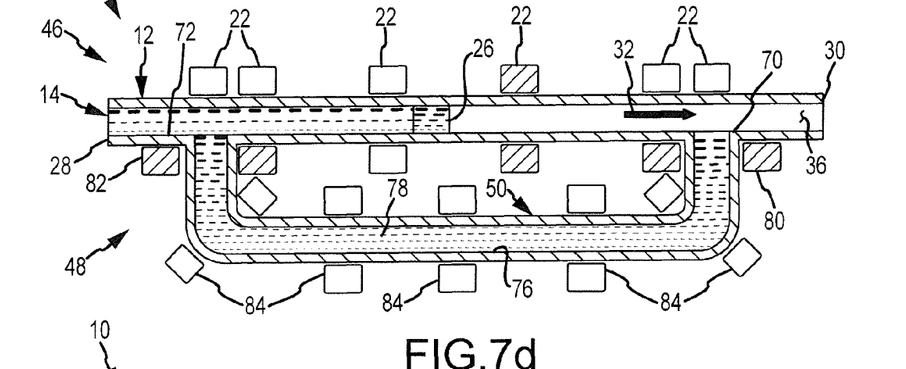
Figure 7E:
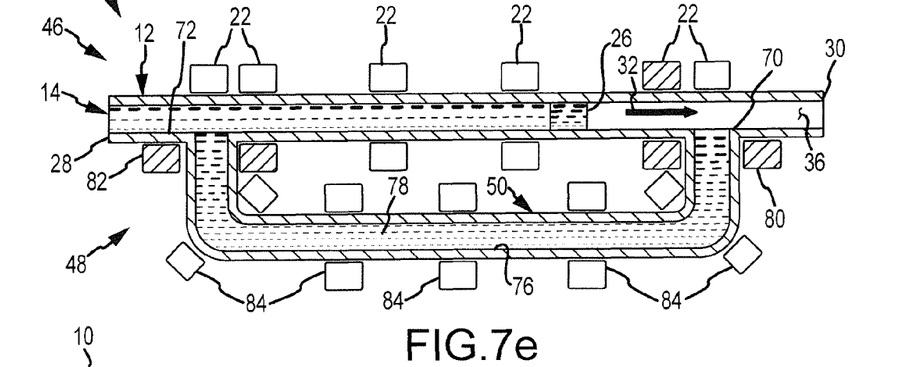
Figure 7F:
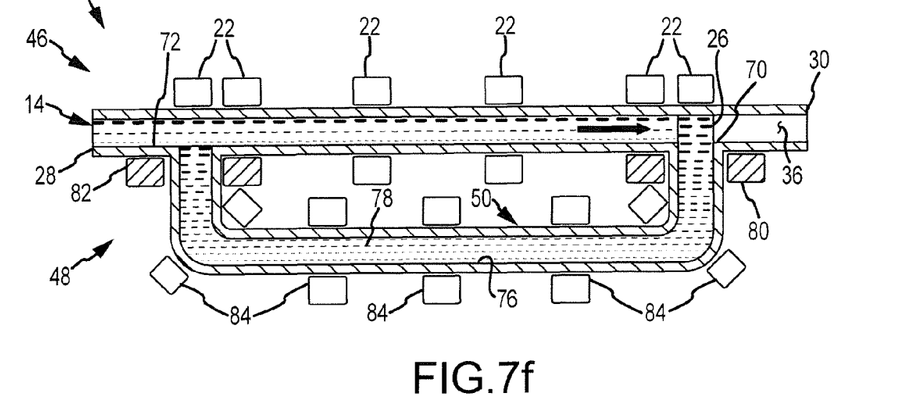

Once magnetic fluid slug 26 reaches the downstream magnet 22, as shown in FIG. 7b, the magnet control system 24 (FIG. 1) deactivates that magnet and activates the next downstream magnet 22 to pull the magnetic fluid slug 26 further along the flow channel 12 in the downstream direction 32, as depicted by the cross-hatched magnet illustrated in FIG. 7c. Voltage control system 20 (FIG. 1) may continue to apply the voltage potentials to the various electrodes 16 and 18 in order to provide the electro-osmotic flow component to fluid 14. That is, the fluid flow is facilitated by both magnetohydrodynamic and electro-osmotic flow processes. The voltage and magnet control systems 20 and 24 (FIG. 1) may continue to operate together to move the magnetic fluid slug 26 and fluid 14 along the flow channel 12, as depicted in FIGS. 7d and 7e.

Once the magnetic fluid slug 26 reaches the "downstream" opening 70 in flow channel 12, the gate magnet 80 may be de-energized to allow the magnetic fluid slug 26 to re-enter the reservoir flow channel 76. Meanwhile, the "upstream" gate magnet 82 may also be de-energized to allow a new magnetic fluid slug 26' to enter the flow channel 12 at the upstream position (i.e., via opening 72). It should be noted that gate magnets 80 and 82 are not yet de-energized in the operational sequence depicted in FIG. 7f. The movement of the magnetic fluid 78 within reservoir 50 may be assisted via the operation of the optional magnets 84, if provided. A new flow cycle may then be initiated in the manner just described.

Figure 8:
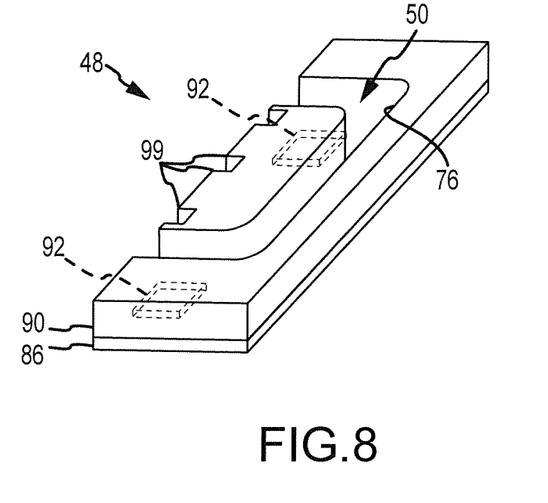
FIG. 8 is an enlarged perspective view of a portion of the reservoir section illustrated in FIG. 2.

The reservoir portion 48 may also be implemented as a MEMS device that may be conveniently mounted or attached to the pump portion 46, as best seen in FIG. 2. The reservoir portion 48 may be fabricated in accordance with a process similar to that used to fabricate the pump portion 46. For example, and with reference now to FIGS. 8 and 9 simultaneously, the reservoir portion 48 may comprise a bottom plate 86 and a top plate 88 that are positioned on either side of a main body portion 90 to form the flow reservoir 50. The bottom and top plates 86 and 88 may be formed from silicon and may be provided with electromagnetic coils 92 thereon that together form the gate magnets 80 and 82 described above.

Figure 10:
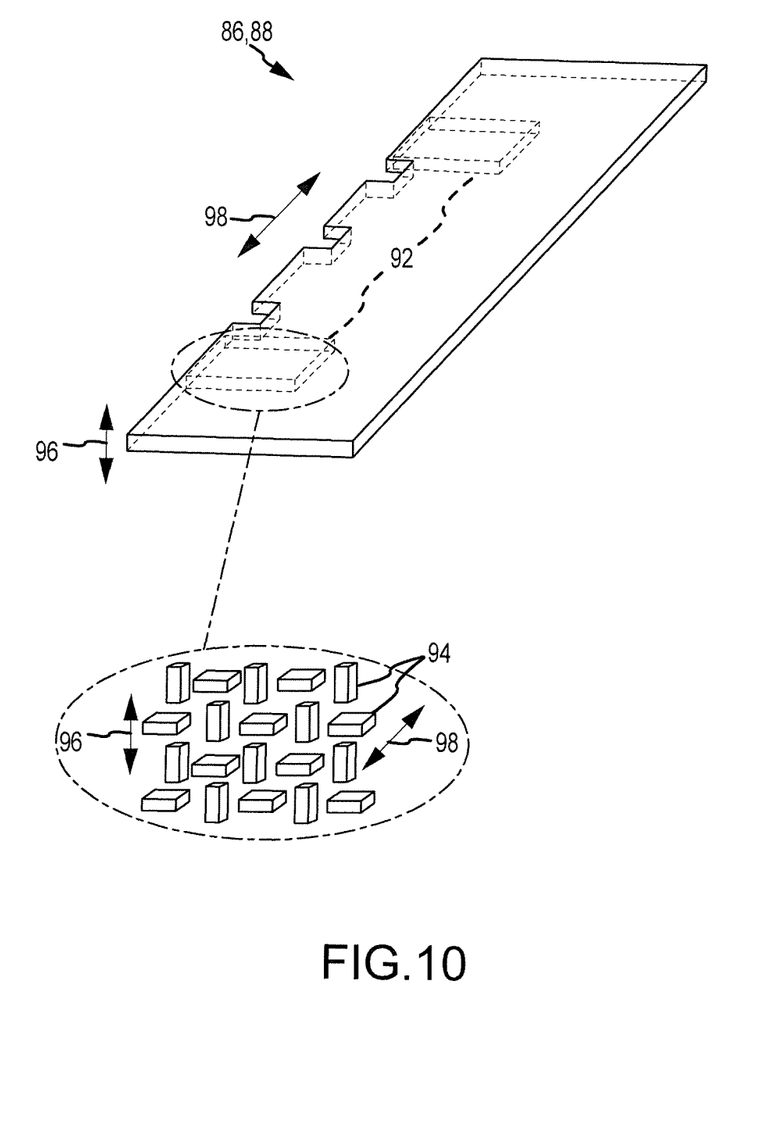
FIG. 10 is an enlarged perspective view of the bottom and top plates of the reservoir section showing a winding orientation for the gate electromagnets provided thereon.

Referring now to FIG. 10, the bottom and top plates 86 and 88 are substantially similar to one another and may be provided with a pair of electromagnetic coils 92 thereon at positions that will be substantially aligned with the openings 70 and 72 provided on the pump portion 46. See, for example, FIG. 2 and FIGS. 7a-f. Each electromagnetic coil 92 may comprise a plurality of elements or windings 94 that arranged in the manner best seen in FIG. 10. More specifically, for each electromagnetic coil 92, about half of the windings 94 are oriented vertically (i.e., along the height 96 of the plate 86, 88), whereas the other half of the windings 94 are oriented horizontally (along the length 98 of the plate 86, 88). Stated another way, if each electromagnetic coil site is considered to be a matrix, with each element of the matrix corresponding to a winding 94, the odd-numbered matrix entries in the first row comprise windings 94 that are oriented vertically (i.e., in the direction of arrow 96), whereas the even-numbered matrix entries in the first row comprise windings 94 that are oriented horizontally (i.e., in the direction of arrows 98). In the second row of matrix entries, the odd-numbered matrix entries comprise windings that are oriented horizontally, whereas the even-numbered matrix entries comprise windings that are oriented vertically, and so on.

Figure 9:
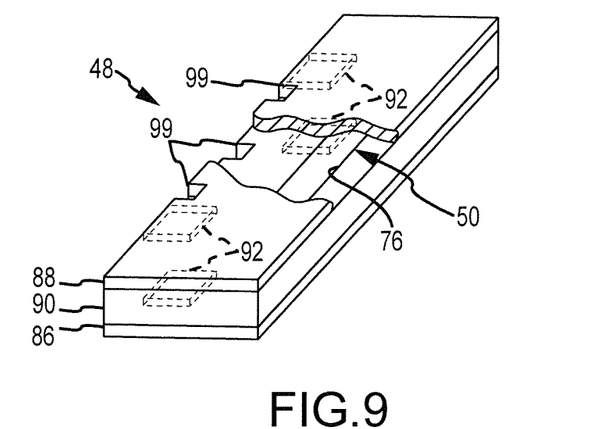
FIG. 9 is an enlarged perspective view of the reservoir section of FIG. 8 having a top plate provided thereon.

Once the bottom and top plates 86 and 88 have been fabricated with the electromagnetic coils 92, the main body 90 may be deposited on the bottom plate 86. Main body 90 may be deposited or "built" thereon by the "spin-on-glass" (SOG) technique described above for the fabrication of the pump portion 46. The reservoir flow channel 76 may be formed in the SOG main body 90 by any convenient process, such as by reactive ion etching. A plurality of grooves 99 sized to accommodate the magnets 22 provided on the pump portion 46 (FIG. 2) may also be formed on the reservoir portion 48 by reactive ion etching. Thereafter, the top plate 88 may be affixed to the main body 90, as best seen in FIG. 9. The reservoir portion 48 may then be affixed to the pump portion 46, as best seen in FIG. 2.

Figure 11:
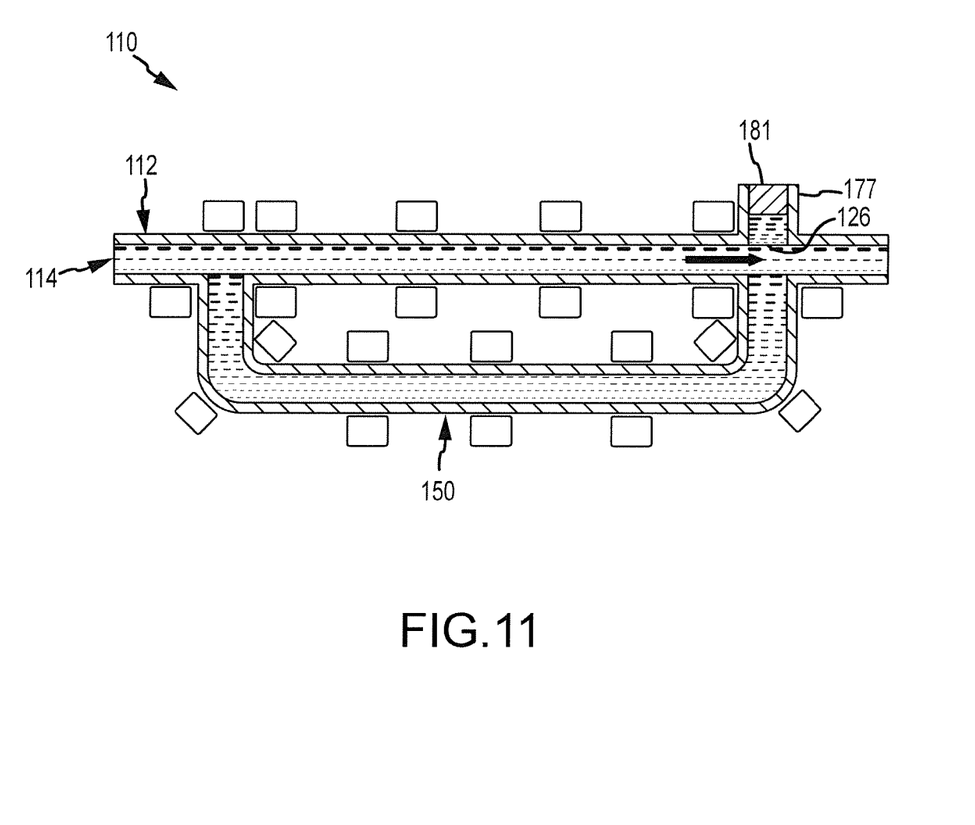
FIG. 11 is a schematic representation of another embodiment of an integrated pump according to the present invention.

Still other arrangements and embodiments of the integrated electro-magnetohydrodynamic pump 10 according to the teachings of the present invention are possible. For example, in another arrangement illustrated in FIG. 11, a pump 110 having a magnetic fluid reservoir 150 may be provided with a side channel 177 sized to receive a magnetic fluid slug 126. A "capture" magnet 181 may be provided adjacent side channel 177 to capture and hold magnetic fluid slug 126 as depicted in FIG. 11. Thus, the flow of fluid 114 in flow channel 112 can be initiated (i.e., the pump 110 primed) by the movement of the magnetic fluid slug 126 in accordance with the magnetohydrodynamic flow process described above. Then, once the magnetic fluid slug 126 reaches the side channel 177, the capture magnet 181 may be activated (e.g., by magnet control system 24, FIG. 1) to capture and hold the magnetic fluid slug 126 in the side channel 177. Thereafter, the pump 110 may be operated in the electro-osmotic flow mode, wherein the fluid 114 is caused to flow as a result of the electro-osmotic flow process described herein.

Having herein set forth preferred embodiments of the present invention, it is anticipated that suitable modifications can be made thereto which will nonetheless remain within the scope of the invention.

The invention shall therefore only be construed in accordance with the following claims:

1. A pump, comprising:
   a flow channel adapted to contain a fluid to be pumped;
   a plurality of electrodes positioned adjacent said flow channel;
   voltage control means operatively associated with said plurality of electrodes for applying a voltage potential on said plurality of electrodes;
   a plurality of magnets positioned adjacent said flow channel; and
   magnet control means operatively associated with said plurality of magnets for changing magnetic fields produced by said plurality of magnets with respect to said flow channel,
   wherein said voltage control means and said magnet control means are operable to pump fluid contained in the flow channel by an electro-osmotic flow process and by a magnetohydrodynamic flow process.

2. The pump of claim 1, wherein said voltage control means may be operated independently from said magnet control means so that said pump operates to pump the fluid contained in the flow channel solely by the electro-osmotic flow process.

3. The pump of claim 1, wherein said magnet control means may be operated independently from said voltage control means so that said pump operates to pump the fluid contained in the flow channel solely by the magnetohydrodynamic flow process.

4. The pump of claim 1, wherein each of said plurality of magnets comprises an electromagnet and wherein said magnet control means comprises a means for providing an electric current to each of said electromagnets.

5. The pump of claim 4, wherein said flow channel defines a flow axis and wherein each of said electromagnets comprises a wire coil surrounding said flow channel so that said wire coil is substantially perpendicular to said flow axis of said flow channel.

6. The pump of claim 1, wherein said plurality of electrodes comprises a first set of electrodes and a second set of electrodes arranged in an alternating configuration, said first set of electrodes having surface areas that are greater than the second set of electrodes.

7. The pump of claim 1, wherein said pump comprises a micro-electro-mechanical (MEMS) system.

8. The pump of claim 1, further comprising a fluid reservoir fluidically connected to said flow channel by a first opening provided at a first location in said flow channel and by a second opening provided at a second location in said flow channel, said fluid reservoir containing a quantity of magnetic fluid.

9. The pump of claim 8, further comprising:
   first gate magnet means positioned adjacent the first opening for selectively allowing at least a portion of the magnetic fluid in said fluid reservoir to enter and leave said flow channel; and
   second gate magnet means positioned adjacent the second opening for selectively allowing at least a portion of the magnetic fluid in said fluid reservoir to enter and leave said flow channel.

10. The pump of claim 9, wherein said fluid reservoir comprises a substantially U-shaped configuration.

11. The pump of claim 1, wherein said flow channel comprises at least a bottom portion and wherein said plurality of electrodes are provided on said bottom portion of said flow channel.

12. The pump of claim 1, wherein a cross-section of said flow channel is substantially rectangular, having a bottom portion, a top portion, and two opposed side portions.

13. The pump of claim 12, said plurality of electrodes comprise a first set of electrodes and a second set of electrodes provided on the bottom portion of said flow channel, said second set of electrodes being interleaved with said first set of electrodes so that individual ones of said first electrodes are separated by a second electrode.

14. The pump of claim 13, wherein individual ones of said first set of electrodes have surface areas that are greater than surface areas of individual ones of said second set of electrodes.

15. The pump of claim 1, further comprising a first outlet port fluidically connected to a first end of said flow channel and a second outlet port fluidically connected to a second end of said flow channel.

16. A pump, comprising:
    a flow channel adapted to contain a fluid to be pumped;
    a plurality of electrodes positioned adjacent said flow channel;
    a voltage control system operatively associated with said plurality of electrodes, said voltage control system applying a voltage potential on said plurality of electrodes;
    a plurality of electromagnets positioned adjacent said flow channel; and
    a current control system operatively associated with said plurality of electromagnets, said current control system applying an electric current to said plurality of electromagnets;
    wherein said voltage control system and said current control system are operable to pump fluid contained in the flow channel by a combination of electro-osmotic and magnetohydrodynamic flow.

17. A method for pumping a fluid, comprising:
    filling a flow channel with the fluid to be pumped;
    creating an electric field within at least a portion of the flow channel to pump the fluid by an electro-osmotic flow process; and
    creating a magnetic field within at least a portion of the flow channel to pump the fluid by a magnetohydrodynamic flow process so that the fluid is moved within the flow channel by a combination of the electro-osmotic and he flow channel.

18. The method of claim 17, wherein said creating an electric field comprises applying a voltage potential to a plurality of electrodes positioned adjacent at least a portion of the flow channel.

19. The method of claim 17, further comprising providing a magnetic fluid slug in the flow channel, the magnetic field causing the fluid slug to move within the flow channel, the magnetic fluid slug also moving the fluid within the flow channel.

20. The method of claim 19, further comprising:
    providing a fluid reservoir that is in fluid communication with the flow channel; and recirculating the magnetic fluid slug in the flow channel via the fluid reservoir.

21. The method of claim 20, wherein said recirculating comprises supplying electric current to individual ones of said electromagnets so said to divert said magnetic fluid slug into the fluid reservoir.

22. The method of claim 17, wherein said filling comprises filling the flow channel with a gas.

23. The method of claim 17, wherein said filling comprises filling the flow channel with a liquid.

24. A pump, comprising:
   flow channel means for containing a fluid to be pumped;
   electro-osmotic pumping means operatively associated with said flow channel means for pumping the fluid contained in said flow channel means by an electro-osmotic flow process;
   magnetohydrodynamic pumping means operatively associated with said flow channel means for pumping the fluid contained in said flow channel means by a magnetohydrodynamic flow process; and
   control system means operatively associated with said electro-osmotic pumping means and said magnetohydrodynamic pumping means for selectively operating said electro-osmotic pumping means alone, said magnetohydrodynamic pumping means alone, and said electro-osmotic pumping means together with said magnetohydrodynamic pumping means, said control system means being selectively operable to pump the fluid contained in said flow channel means solely by the electro-osmotic flow process, solely by the magnetohydrodynamic flow process, and by a combination of the electro-osmotic and magnetohydrodynamic flow processes; wherein said magnetohydrodynamic pumping means comprises a plurality of electromagnets positioned adjacent said flow channel means.

25. The pump of claim 24, wherein said electro-osmotic pumping means comprises a plurality of electrodes positioned adjacent said flow channel means.

26. The pump of claim 25, wherein control system means further comprises:
   a voltage control system for applying a voltage potential to said plurality of electrodes; and
   a current control system for applying an electric current to said plurality of electromagnets.

27. The pump of claim 26, further comprising a fluid reservoir fluidically connected to said flow channel means by a first opening provided at a first location in said flow channel means and by a second opening provided at a second location in said flow channel means, said fluid reservoir containing a quantity of magnetic fluid.

28. The pump of claim 27, further comprising:
   first gate magnet means positioned adjacent the first opening for selectively allowing at least a portion of the magnetic fluid in said fluid reservoir to enter and leave said flow channel means; and
   second gate magnet means positioned adjacent the second opening for selectively allowing at least a portion of the magnetic fluid in said fluid reservoir to enter and leave said flow channel means.

* * * * *

UNITED STATES PATENT AND TRADEMARK OFFICE
CERTIFICATE OF CORRECTION

PATENT NO.         : 8,480,377 B2                                  Page 1 of 1
APPLICATION NO.    : 12/854395
DATED              : July 9, 2013
INVENTOR(S)        : Constantin Ciocanel and Nazmul Islam It is certified that error appears in the above-identified patent and that said Letters Patent is hereby corrected as shown below:

In the Claims:

Col. 16, Claim 17, line 55, the text "he flow channel" should be changed to -- magnetohydrodynamic flow processes; wherein said creating a magnetic field comprises applying an electric current to a plurality of electromagnets positioned adjacent at least a portion of the flow channel --

Signed and Sealed this
Fourth Day of March, 2014

Michelle K. Lee
*Deputy Director of the United States Patent and Trademark Office*